No. 627,554. Patented June 27, 1899.
O. WEISE.
MECHANICAL MOVEMENT.
(Application filed May 5, 1898.)
(No Model.) 2 Sheets—Sheet 1.

No. 627,554. Patented June 27, 1899.
O. WEISE.
MECHANICAL MOVEMENT.
(Application filed May 5, 1898.)

(No Model.) 2 Sheets—Sheet 2.

Witnesses
Julius Lutz.
Isaac O'Wen.

Inventor:
O. Weise.
By Munn
Attorneys.

UNITED STATES PATENT OFFICE.

OTTO WEISE, OF ASCHERSLEBEN, GERMANY.

MECHANICAL MOVEMENT.

SPECIFICATION forming part of Letters Patent No. 627,554, dated June 27, 1899.

Application filed May 5, 1898. Serial No. 679,809. (No model.)

*To all whom it may concern:*

Be it known that I, OTTO WEISE, a subject of the King of Prussia, Emperor of Germany, residing at Aschersleben, in the Province of Saxony, Kingdom of Prussia, and German Empire, have invented certain new and useful Improvements in Mechanical Movements, of which the following is a full, clear, and exact description.

This invention relates to that class of mechanism employed in putting screws into and out of action; and its object is to provide means for the rapid adjustment of the gripping-jaws in engineers' or joiners' bench-vises and the like or the quick return of the screw in other forms of mechanism—as, for example, in drills.

The invention consists generally in mounting the screwed spindle in a bush in which it slides longitudinally, but upon rotation carries the bush around owing to a keyway-and-feather connection between the two, and in so forming one collar of the bush with a pawl-shaped tooth that rotation in one direction acts upon a specially-formed sliding nut to throw the screw out of gear, but rotation in the reverse direction allows the nut to come into gear again.

Figure 1:
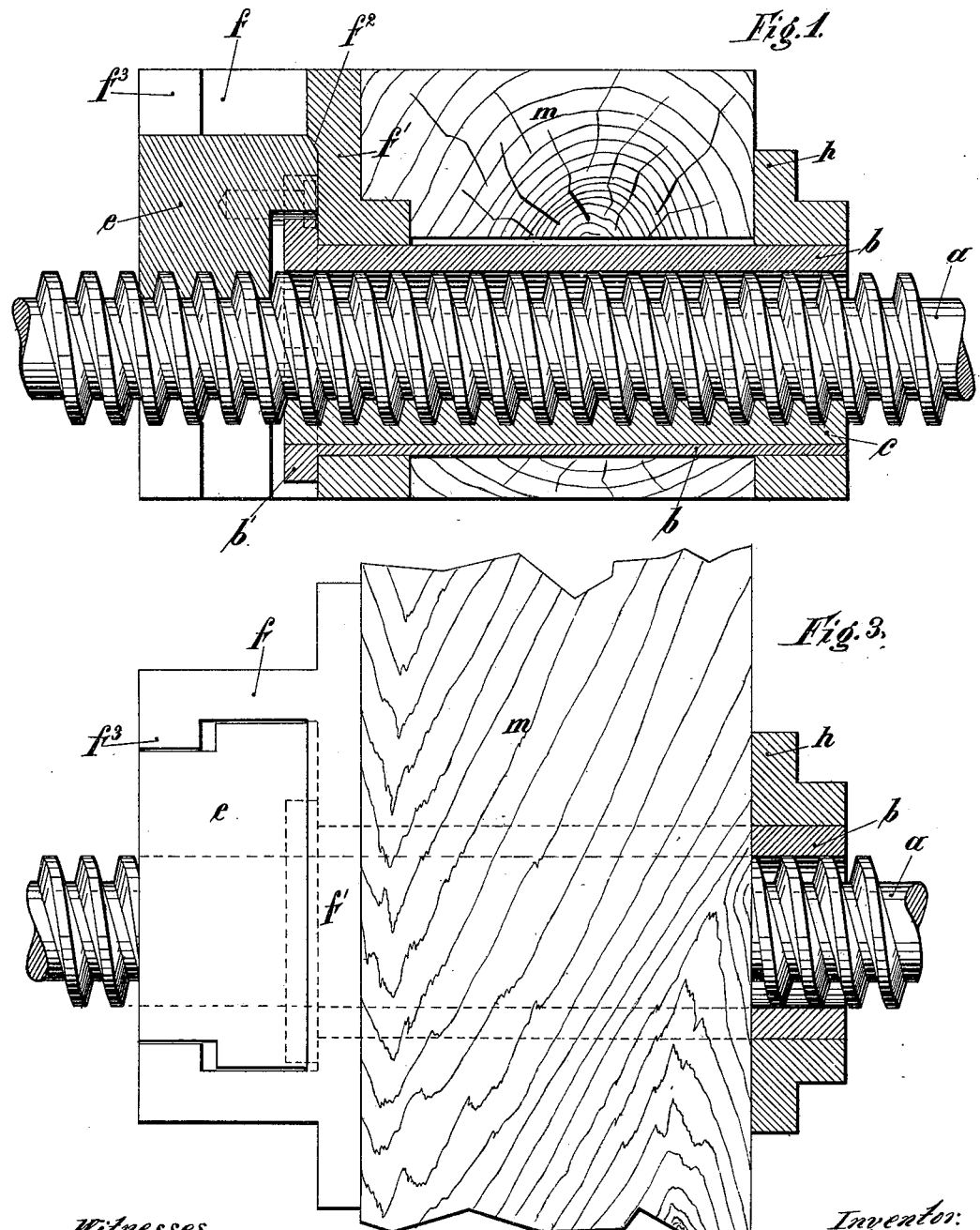
Figure 2:
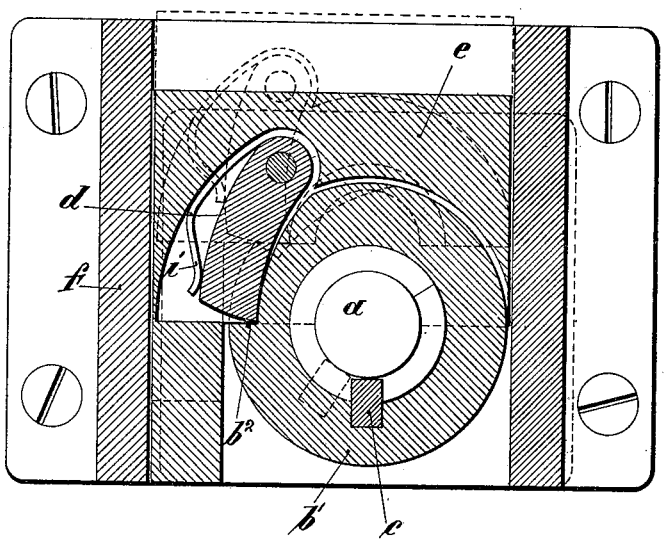

The mode of carrying the invention into effect is illustrated in the accompanying sheet of drawings, as follows:

Figure 1 is a longitudinal section showing the nut in gear. Fig. 2 is a transverse section with the disengaged position of the nut indicated by dotted lines. Fig. 3 is a plan, partly in section.

Referring to the drawings, the screwed spindle $a$ is carried in a bush $b$, and while it is free to move longitudinally therein it is attached by a feather $c$, so that a rotation of the screw also revolves the bush. On the front side of the wooden framework $m$ of the joiner's bench a bracket $f$ is attached, and opposite to this, on the other side, a plate $h$ is fixed, and the bush $b$ is carried in suitable bearings formed in these two pieces. A half-nut $e$ slides in a T-shaped groove formed between the projections $f^3$ of the bracket $f$, and this nut carries a spring-pawl $d$, which engages under certain conditions with a pawl-shaped tooth $b^2$, formed on an annular flange $b'$ at one end of the bush $b$.

When it is desired to keep the screw-spindle in gear and so operate it as a means of gripping an object, the spindle $a$ is turned contra-clockwise relatively to Fig. 2. The nut $e$, having a slight clearance, as shown in Fig. 3, in its T-headed slide, moves slightly forward, and a chamfered portion $f^2$ comes under a corresponding chamfer formed on the portion $f'$ of the bracket. The nut $e$ is prevented from rising by the chamfer, and the rotation of the bush and its pawl portion $b^2$ only forces the pawl $d$ back against its spring $i$ into a recess and does not lift the nut out of gear.

To throw the nut $e$ out of gear, the spindle $a$ is rotated in a clockwise direction until the projection $b^2$ engages with the spring-pawl $d$, and as the nut also moves slightly backward and clears the chamfer $f^2$ the projection $b^2$ and pawl $d$ elevate the nut into the position shown in dotted lines in Fig. 2 out of gear with the screw. The screw-spindle $a$ can now be displaced longitudinally in the bush $b$, so that a rapid adjustment of this spindle with its attachments may be made. When the adjustment has been made, a further rotation of the screw in the same direction frees the pawl $d$ and allows the nut $e$ to drop back into gear by its own weight.

It is evident that this improved mechanism can be applied to all forms of vises or presses in which a screw is employed, and also may be adapted to drills or machine-tools where a quick return or rapid adjustment of a screwed spindle is necessary, and all without departing from the subject of the present invention.

What I claim, and desire to secure by Letters Patent, is—

1. The combination with a framework, of a bushing mounted to turn therein and having an internal feather, a screw mounted in the bushing and having a way for the reception of the feather, a vertically-disposed bracket attached to one side of the framework adjacent to one end of the bushing, a nut mounted to slide in the bracket and resting by gravity on the screw, an annular flange formed on the end of the bushing adjacent to the nut and having a peripheral tooth or projection, and a pawl mounted on the nut and bearing against the edge of the flange to lift the nut when the bushing is turned in a direction to engage the tooth or projection with the pawl.

2. The combination with a framework, of a bushing mounted to turn therein, a screw mounted in the bushing to turn therewith and slide therein, a flange attached to one end of the bushing and having a peripheral tooth, a bracket attached to the framework adjacent to the flange, a nut mounted to slide in the bracket and normally engaging the screw, and a pawl attached to the nut and running on the periphery of the flange to lift the nut when the bushing is turned to engage the tooth with the pawl.

In witness whereof I subscribe my signature in presence of two witnesses.

OTTO WEISE.

Witnesses:
 HENRY W. DIEDERICH,
 E. PEINEMANN.